US012730996B2

(12) United States Patent
Matsubara et al.

(10) Patent No.: US 12,730,996 B2
(45) Date of Patent: Sep. 8, 2026

(54) CODE FORMATION METHOD AND INFORMATION CODE

(71) Applicant: DENSO CORPORATION, Kariya-city (JP)

(72) Inventors: Shuichi Matsubara, Kariya-city (JP); Tatsuya Okabe, Kariya-city (JP); Shinichi Kikuchi, Kariya-city (JP); Mitsuo Okumura, Kariya-city (JP); Hiroyuki Sakakibara, Kariya-city (JP); Yuji Ito, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 0 days.

(21) Appl. No.: 19/169,345

(22) Filed: Apr. 3, 2025

(65) Prior Publication Data

US 2025/0232142 A1 Jul. 17, 2025

Related U.S. Application Data

(63) Continuation of application No. PCT/JP2023/033209, filed on Sep. 12, 2023.

(30) Foreign Application Priority Data

Oct. 7, 2022 (JP) ................................ 2022-162552

(51) Int. Cl.

| | |
|---|---|
| ***G06K 19/06*** | (2006.01) |
| ***G06K 7/12*** | (2006.01) |
| ***G06K 15/02*** | (2006.01) |

(52) U.S. Cl.
CPC .......... *G06K 7/12* (2013.01); *G06K 15/1872* (2013.01); *G06K 19/0614* (2013.01)

(58) Field of Classification Search
CPC .................................................. G06K 19/0614
See application file for complete search history.

(56) References Cited

U.S. PATENT DOCUMENTS

| | | | |
|---|---|---|---|
| 10,769,397 B2 * | 9/2020 | Teraura ................ | G06K 7/1417 |
| 2011/0169024 A1 | 7/2011 | Verschuren et al. | |

(Continued)

FOREIGN PATENT DOCUMENTS

| | | |
|---|---|---|
| DE | 10115949 A1 | 10/2002 |
| JP | 2004-318945 A | 11/2004 |
| JP | 2018-089840 A | 6/2018 |

*Primary Examiner* — Thien M Le
*Assistant Examiner* — April A Taylor
(74) *Attorney, Agent, or Firm* — Precision Patents, P.C.

(57) ABSTRACT

A code formation method for forming an information code on a target object is provided. The information code stores information with an array of a light area and a dark area. The code formation method includes forming an emissive layer by applying, to the target object, a coating material containing a reactive paint that emits light in response to invisible light, and irradiating a portion of the emissive layer corresponding to the dark area with laser light to reduce an emissive performance of the dark area to be lower than an emissive performance of the light area. The irradiating with the laser light includes irradiating with the laser light to make a transmittance for the invisible light in the portion corresponding to the dark area higher than a transmittance for the invisible light in a portion of the emissive layer corresponding to the light area.

13 Claims, 8 Drawing Sheets

(56) References Cited

U.S. PATENT DOCUMENTS

2021/0303810 A1* 9/2021 Sugiyama ............ G06K 7/1417
2022/0122026 A1 4/2022 Okabe et al.
2023/0094590 A1 3/2023 Okabe

* cited by examiner

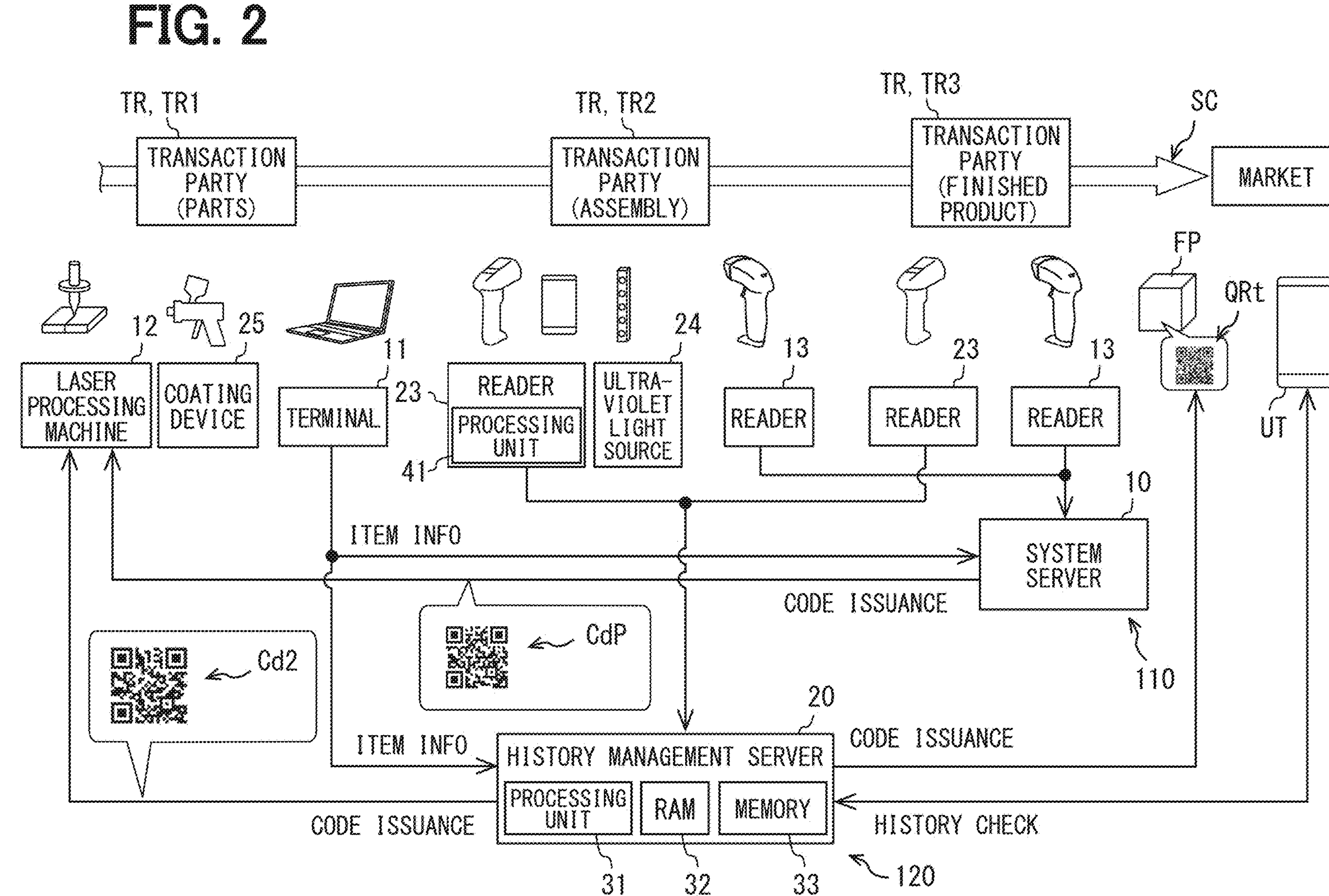
FIG. 2
TR, TR1
TRANSACTION PARTY (PARTS)
TR, TR2
TRANSACTION PARTY (ASSEMBLY)
TR, TR3
TRANSACTION PARTY (FINISHED PRODUCT)
SC
MARKET
FP
QRt
UT
12
LASER PROCESSING MACHINE
25
COATING DEVICE
11
TERMINAL
23
READER
PROCESSING UNIT
41
24
ULTRA-VIOLET LIGHT SOURCE
13
READER
23
READER
13
READER
10
SYSTEM SERVER
110
ITEM INFO
CODE ISSUANCE
CdP
Cd2
20
HISTORY MANAGEMENT SERVER
ITEM INFO
CODE ISSUANCE
CODE ISSUANCE
HISTORY CHECK
PROCESSING UNIT
RAM
MEMORY
31
32
33
120

FIG. 4
TRANSMITTANCE MEASUREMENT PIECE
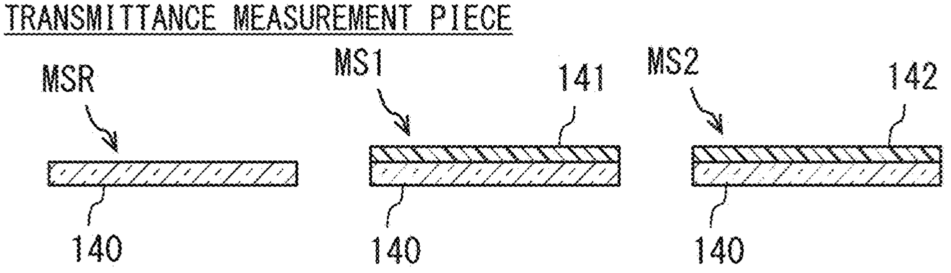
TRANSMITTANCE MEASUREMENT CONDITION
| TRANSMITTANCE MEASUREMENT | SPECTROPHOTOMETER |
|---|---|
| MODEL | MCPD-7700 |
| MANUFACTURER | OTSUKA ELECTRONICS |
TRANSMITTANCE TEST RESULT
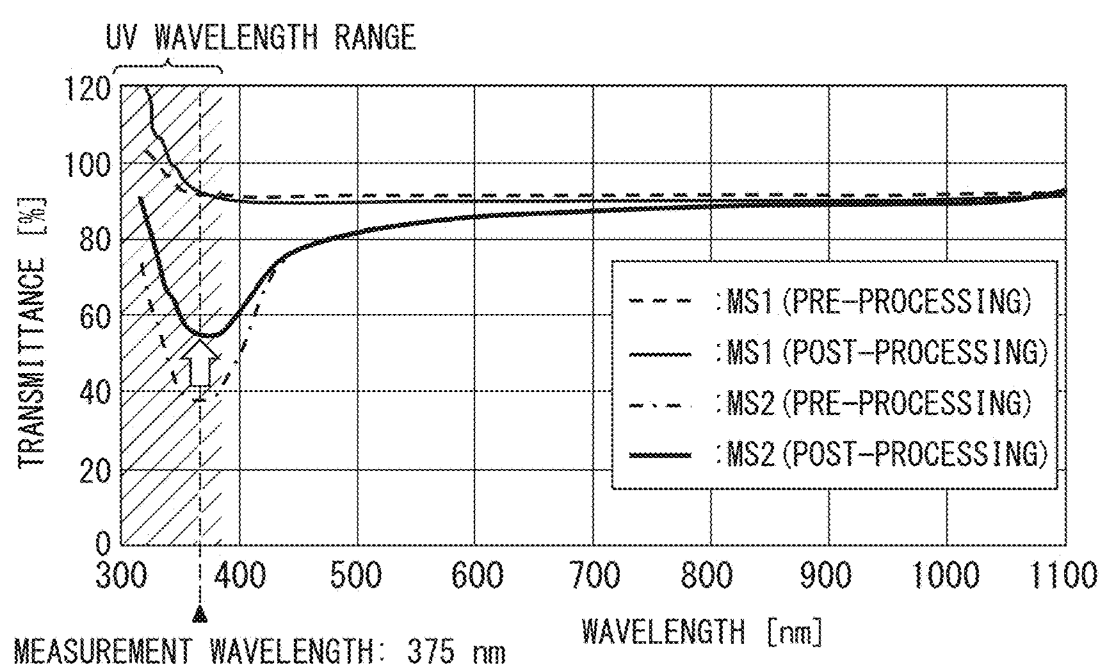
MEASURED DATA
| | MSR | MS1 | MS2 |
|---|---|---|---|
| PRE-PROCESSING TRANSMITTANCE | 93% | 92% | 38% |
| POST-PROCESSING TRANSMITTANCE | | 92% | 55% |

| LASER OUTPUT (W) | | REFERENCE | 0.08 | 0.04 | 0.02 | 0.0167 | 0.0133 | 0.01 | 0.0067 | 0.0033 |
|---|---|---|---|---|---|---|---|---|---|---|
| SURFACE STATE | IMAGE | | | | | | | | | |
| | MEASURED VALUE (μm) | 0 | 6.5 | 3.4 | 0 *PARTIALLY 23 | 0 *PARTIALLY 30 | 0 | 0 | 0 | 0 |
| LIGHT-EMITTING STATE DURING ULTRA-VIOLET IRRADI-ATION | IMAGE | | | | | | | | | |
| | MEASURED VALUE | 0 | 33.72 | 28.38 | 40.95 | 38.15 | 34.43 | 22.34 | 3.43 | 2.17 |

FIG. 6

LASER PROCESSING MACHINE

| | |
|---|---|
| MODEL | PHAROS-20W-0.2mJ-1MHz |
| MANUFACTURER | Light Conversion |

PROCESSING CONDITION

| | |
|---|---|
| WAVELENGTH (nm) | 343 |
| BEAM DIAMETER (mm) | 0.0045 |
| PULSE WIDTH (fs) | 250 |
| FREQUENCY (kHz) | 500 |
| FOCAL POINT (mm) | 0 |
| HATCHING PITCH (mm) | 0.0014 |
| OVERLAP RATE (%) | 69 |
| ASSIST GAS | NONE |
| SCANNING AXIS | SINGLE AXIS |
| SCANNING DIRECTION | BIDIRECTIONAL |

LASER LIGHT OUTPUT

8 STAGES FROM 0.08 to 0.033

MS3

50

240

MATERIAL

SPCC MATTE BLACK COATING
(t0.8 × 70 × 70)

FIG. 7

OBSERVATION CONDITION

| IMAGE OBSERVATION | MICROSCOPE |
| --- | --- |
| MODEL | VHX-7100 |
| MANUFACTURER | KEYENCE |
| OBJECTIVE LENSE | ×150 |
| ILLUMINATION | COAXIAL EPI-ILLUMINATION |

FIG. 8

DEPTH MEASUREMENT CONDITION

| DEPTH MEASUREMENT | WHITE LIGHT INTERFEROMETER |
| --- | --- |
| MODEL | nexview |
| MANUFACTURER | ZYGO |
| OBJECTIVE LENSE | ×5.5 |
| SCAN LENGTH | 100 μm |

FIG. 9

DEVICE

| STILL IMAGE CAPTURING | |
|---|---|
| CAMERA FORMAT | LUMIX S1R |
| MANUFACTURER | Panasonic |
| OBJECTIVE LENSE | S-R24105 |
| ULTRAVIOLET LIGHT IRRADIATION | |
| BLACK LIGHT FORMAT | LHA-UV375/1-K |
| MANUFACTURER | OHM ELECTRIC |
| COLOR STRENGTH MEASUREMENT | |
| SOFTWARE | Photoshop 2022 |
| MANUFACTURER | Adobe |
| Ver. | 23.5.0 |

PHOTOGRAPHY CONDITIONS

| APERTURE | F8.0 |
|---|---|
| SHUTTER SPEED | 2″ |
| ISO | 2000 |
| WB | 5600K |
| LENSE | 105mm |

ENVIRONMENT CONDITIONS

| PLACE | PHOTOGRAPHY ROOM |
|---|---|
| LIGHTING | ALL OFF |
| NATURAL LIGHT | LIGHT SHIELDING WITH BLACKOUT CURTAINS FOR WINDOWS |
| BACKGROUND | BLACK STYRENE BOARD |

CODE FORMATION METHOD AND INFORMATION CODE

CROSS REFERENCE TO RELATED APPLICATIONS

The present application is a continuation application of International Patent Application No. PCT/JP2023/033209 filed on Sep. 12, 2023, which designated the U.S. and claims the benefit of priority from Japanese Patent Application No. 2022-162552 filed on Oct. 7, 2022. The entire disclosures of all the above applications are incorporated herein by reference.

TECHNICAL FIELD

The present disclosure relates to a technique for an information code storing information.

BACKGROUND

There is a method for printing a transparent two-dimensional code using a transparent toner that exhibits infrared light absorption properties. This two-dimensional code appears and becomes readable when exposed to infrared light.

SUMMARY

In order to achieve the above objective, a code formation method for forming an information code on a target object is provided. The information code stores information with an array of a light area and a dark area. The code formation method includes forming an emissive layer including a forming area of the information code by applying, to the target object, a coating material containing a reactive paint that emits light in response to an invisible light, and irradiating a portion of the emissive layer corresponding to the dark area with laser light to reduce an emissive performance of the dark area to be lower than an emissive performance of the light area.

According to another aspect of the present disclosure, an information code that stores information with an array of a light area and a dark area is provided. The information code includes an emissive layer, a strong emissive area, and a weak emissive area. The emissive layer contains a reactive paint that emits light in response to an invisible light. The strong emissive area corresponds to the light area of the emissive layer and is configured to emit light in response to the invisible light. The weak emissive area corresponds to the dark area of the emissive layer. The emissive performance of the reactive paint in the weak emissive area is lower than the emissive performance in the strong emissive area.

BRIEF DESCRIPTION OF THE DRAWINGS

FIG. 2 shows an overall image when a traceability system is operated together with an existing distribution management system.

FIG. 4 is a diagram showing details of a transmittance test for explaining the mechanism by which the emissive performance is reduced by irradiation with laser light.

FIG. 6 is a table showing processing conditions for the test shown in FIG. 5.

FIG. 7 is a table showing the observation conditions of the sample images shown in FIG. 5.

FIG. 8 is a table showing measurement conditions for the depth of an irradiated area and a non-irradiated area.

FIG. 9 is a table showing the measurement conditions for color strength.

EMBODIMENTS TO IMPLEMENT THE INVENTION

To begin with, examples of relevant techniques will be described.

There is a method for printing a transparent two-dimensional code using a transparent toner that exhibits infrared light absorption properties. This two-dimensional code appears and becomes readable when exposed to infrared light.

In the two-dimensional code, areas where transparent toner is not printed become white cells by reflecting infrared light. On the other hand, the areas printed with the transparent toner become black cells by absorbing infrared light. To capture an image of the two-dimensional code, a special reader capable of detecting infrared light is required. As a result, it may be difficult to ensure the convenience of the information code.

It is an objective of the present disclosure to provide an information code that ensures convenience and a method for forming such an information code.

In order to achieve the above objective, a code formation method for forming an information code on a target object is provided. The information code stores information with an array of a light area and a dark area. The code formation method includes forming an emissive layer including a forming area of the information code by applying, to the target object, a coating material containing a reactive paint that emits light in response to an invisible light, and irradiating a portion of the emissive layer corresponding to the dark area with laser light to reduce an emissive performance of the dark area to be lower than an emissive performance of the light area.

According to another aspect of the present disclosure, an information code that stores information with an array of a light area and a dark area is provided. The information code includes an emissive layer, a strong emissive area, and a weak emissive area. The emissive layer contains a reactive paint that emits light in response to an invisible light. The strong emissive area corresponds to the light area of the emissive layer and is configured to emit light in response to the invisible light. The weak emissive area corresponds to the dark area of the emissive layer. The emissive performance of the reactive paint in the weak emissive area is lower than the emissive performance in the strong emissive area.

According to the aspects described above, the emissive performance of the dark area of the emissive layer containing the reactive paint is reduced compared to the emissive performance of the light area. Thus, illumination with invisible light reveals an array of the dark and light areas having different emission intensity. According to the above, a special reader is not required to read the information code. Thus, the convenience of the information code can be ensured.

Figure 1:
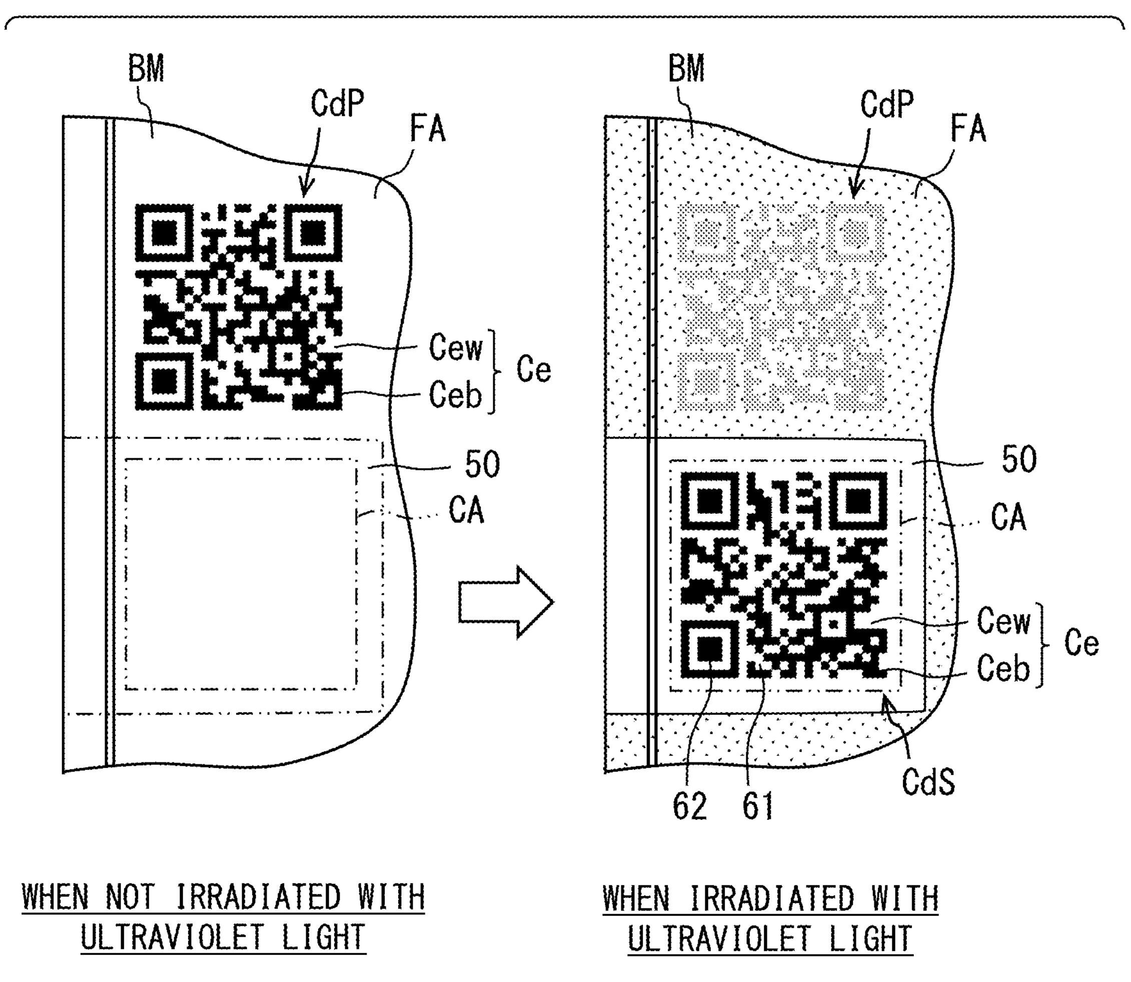
FIG. 1 shows a secret code according to an embodiment of the present disclosure.

The information code according to an embodiment of the present disclosure shown in FIG. 1 is a secret code CdS that stores secret information. The secret code CdS is formed on a target object made of a material such as a resin or a metal (hereinafter, referred to as a marking part BM) together with a public code CdP that stores public information. The public code CdP and the secret code CdS are engraved at intervals on the flat portion FA of the marking part BM through laser marking. The flat portion FA may be a portion where the base material of the marking part BM is exposed, or may be a painted surface of the marking part BM. The public code CdP and the secret code CdS are, for example, two-dimensional codes such as QR codes (registered trademark). The public code CdP and the secret code CdS each record information using a two-dimensional array of multiple cells Ce, which includes light cells Cew and dark cells Ceb.

The public code CdP is a two-dimensional code (visible code) that can be seen with the normal naked eye. The light cells Cew of the public code CdP are portions that are not irradiated with the laser light and remain in their bare state. On the other hand, the dark cells Ceb of the public code CdP are portions where the surface of the base material has been altered by irradiation with the laser light. The public code CdP makes it possible to read the public information by utilizing the difference in brightness (the difference in visible light reflectance) between the unaltered light cells Cew and the altered dark cells Ceb.

The secret code CdS is a two-dimensional code (an invisible code) that is not visible to the naked eye, unlike the public code CdP. The secret code CdS can be read by irradiating it with invisible light in a specific wavelength range. When the secret code is not irradiated with the invisible light, the secret code CdS is substantially invisible. For example, when irradiated with ultraviolet light using an ultraviolet light source 24 (see FIG. 2) such as a black light, the secret code CdS becomes readable by emitting visible light.

More specifically, the secret code CdS includes an emissive layer 50, a strong emissive portion 61, and a weak emissive portion 62. The emissive layer 50 contains an ultraviolet-reactive paint (described in detail below) that emits light in response to ultraviolet light. The emissive layer 50 is formed in a thin film shape to cover an area of the flat portion FA that includes the forming area CA of the secret code CdS. The strong emissive portion 61 is located in a portion of the emissive layer 50 that corresponds to the light cells Cew. The strong emissive portion 61 is a portion that is not irradiated with laser light. On the other hand, the weak emissive portion 62 is located in a portion of the emissive layer 50 that corresponds to the dark cells Ceb. The weak emissive portion 62 is a portion in which the emissive function of the ultraviolet-reactive paint is reduced by irradiation with laser light, compared to the strong emissive portion 61. The secret code CdS makes it possible to read the secret information by using the difference in brightness (the difference in luminance) between the light cells Cew formed of the strong emissive portion 61 that emits strong light and the dark cells Ceb formed of the weak emissive portion 62 that has less emissive performance.

The public code CdP is a two-dimensional code used in the distribution management system 110 shown in FIG. 2. On the other hand, the secret code CdS is a two-dimensional code used in the traceability system 120. The public code CdP may be used in both the distribution management system 110 and the traceability system 120.

(Supply Chain Management System) The distribution management system 110 and the traceability system 120 are management systems that manage a supply chain SC structured to include a large number of transaction parties TR. The supply chain SC is connection between the transaction parties for delivering products, such as industrial products, agricultural products, aquatic products, to an end user. As an example, in a supply chain SC for delivering industrial products to consumers, the transaction parties TR include a material supplier, a parts supplier TR1, an assembly supplier TR2, and a finished product manufacturer TR3.

The distribution management system 110 collects, using the public code CdP, transaction records of a transaction item between the transaction parties TR. The distribution management system 110 includes an input terminal 11, a laser processing machine 12, code readers 13, and a system server 10. The input terminal 11, the laser processing machine 12, and the code readers 13 are appropriately provided at a facility of each transaction party TR. The input terminal 11, the laser processing machine 12, and the code readers 13 are connected, via a network, to the system server 10 provided at a data center or the like.

The input terminal 11 is, for example, a personal computer or a tablet terminal. Basic information on the transaction item (hereinafter referred to as item information) supplied to the supply chain SC is input to the input terminal 11 according to a predetermined format. For example, the item information includes an article name, a production place, a production facility, and a producer. The input terminal 11 transmits, to the system server 10, the item information on the transaction item shipped from the transaction party TR.

The laser processing machine 12 is a laser marker that marks the public code CdP on transaction items shipped from the transaction party TR. The laser processing machine 12 may be a fiber laser marker, a UV laser marker, a CO2 laser marker. The laser processing machine 12 engraves the public code CdP on the transaction item. Thus, the transaction item with the public code CdP is distributed. The laser processing machine 12 may be able to mark the public code CdP on the marking part BM (see FIG. 1) made of various materials such as resin, metal, ceramic, paper, wood, glass, and rubber by laser marking.

In addition, for the transaction parties TR who print the public code CdP and put the printed public code CdP on the transaction item to be shipped, a label printer is used instead of the laser processing machine 12. The label printer is an output device for printing the public code CdP on a paper medium. The label printer is configured to perform color or grayscale printing. The paper medium where the public code CdP is printed is attached to a package, an outer box, or the like of the transaction item to be shipped, and is distributed with being attached to the transaction item.

The code reader 13 is a reading device that acquires the public information recorded in the public code CdP by reading the public code CdP. The code reader 13 acquires the public information recorded in the public code CdP and transmits the acquired public information to the system server 10.

The system server 10 is a host node capable of communicating with the input terminal 11, the laser processing machine 12, and the code readers 13. The system server 10 registers the item information acquired from the input terminal 11 in a database. The system server 10 prepares the public information associated with the item information and generates the public code CdP in which the public information is recorded. As processing for issuing the public code CdP, the system server 10 transmits image data of the generated public code CdP to the laser processing machine 12 that is a transmission source of the item information. When the issued public code CdP is distributed together with the transaction item and is read by the code reader 13 of another transaction party TR, the system server 10 accumulates the transaction record of the transaction item of the transaction party TR.

The traceability system 120 is used in combination with the distribution management system 110 and accumulates the transaction records in the same manner as in the distribution management system 110. The distribution management system 110 corresponds to a conventional management system, and the traceability system 120 corresponds to a new management system. The traceability system 120 is operated together with the existing distribution management system 110 without substantially changing the distribution management system 110. The traceability system 120 includes a record reference function that provides access to the accumulated transaction records, as well as a record generation function that accumulates transaction records using the secret code CdS. The traceability system 120 uses blockchain technology to manage the transaction records for preventing tampering with the transaction records.

The traceability system 120 includes code readers 23, an ultraviolet light source 24, and a history management server 20. Further, in the traceability system 120, the input terminal 11 and the laser processing machine 12 of the distribution management system 110 are used. The code readers 23 and the input terminal 11 are connected, via a network, to the history management server 20 provided at a data center or the like.

The code reader 23 and the ultraviolet light source 24 are installed in the transaction party TR (such as the assembly supplier TR2) to which transaction items marked with the secret code CdS are delivered. The code reader 23 is a reading device that reads the secret information recorded in the secret code CdS. The code reader 23 is configured to scan the same object (the marking part BM, see FIG. 1) as the code reader 13, and therefore may be physically integrated with the code reader 13. In other words, the code reader 13 of the distribution management system 110 may also be used in the traceability system 120.

The code reader 23 includes an imaging sensor in which CCD elements are two-dimensionally arrayed, a signal processing unit 41, and the like. The imaging sensor outputs a captured image in which the secret code CdS appears (hereinafter referred to as a code captured image) to the signal processing unit 41. The signal processing unit 41 includes a storage unit that stores a code reading program and the like, a processor that executes code reading processing based on the code reading program, and a RAM. The signal processing unit 41 decodes a read signal (the code captured image) of the imaging sensor according to a predetermined rule through the code reading processing and acquires the secret information recorded in the secret code CdS. Based on the acquired secret information, the signal processing unit 41 communicates with the history management server 20 to store the transaction records.

The code reader 23 may be a smartphone, a tablet terminal, and the like having a camera function. In this aspect, the smartphone or the like may install a dedicated application (hereinafter referred to as a code reading application) corresponding to the code reading program. The code reading application may read the public code CdP in addition to the secret code CdS.

The ultraviolet light source 24 irradiates the marking part BM (see FIG. 1) with ultraviolet light, which is invisible, when the code reader 23 reads the secret code CdS. The ultraviolet light source 24 has ultraviolet LEDs, and emits ultraviolet light in a wavelength band of 300 to 380 nm (for example, a wavelength of 375 nm). Irradiation with ultraviolet light by the ultraviolet light source 24 enables the code reader 23 to capture the secret code CdS.

The history management server 20 is a host node capable of communicating with the input terminal 11 and the laser processing machine 12 in addition to the code readers 23. The history management server 20 is mainly implemented by a computer including a processing unit 31, a RAM 32, a memory 33, an input and output interface, and a bus that connects these units. The processing unit 31 is hardware coupled with the RAM 32 for computation processing. The processing unit 31 executes various types of processing related to data management by accessing the RAM 32. The memory 33 stores a management program related to data management and the like.

The history management server 20 acquires the item information transmitted from the input terminal 11 to the system server 10. Based on acquisition of the item information, the history management server 20 generates a blockchain that is associated with the transaction item and that stores the item information and the transaction records. When the history management server 20 acquires a notification that the secret code CdS is read from the code reader 23 of the transaction party TR, the history management server 20 accumulates, in the blockchain associated with the transaction item, the transaction records of the transaction party TR who issues the notification.

The history management server 20 generates, when acquiring the notification from the code reader 23, a new block for storing the transaction record of the transaction party TR who issues the notification. The new block includes the current transaction record and a hash value calculated from an immediately preceding block. The hash value is generated with a hash function such as SHA-256. The history management server 20 generates a hash value having a number of bits smaller than the amount of data that can be recorded in the secret code CdS. The hash value is data in which a predetermined number of bits (for example, 256 bits) are maintained and in which the item information and the transaction records are reflected.

The history management server 20 generates the secret code CdS in which at least the above-mentioned hash value is recorded as secret information. The history management server 20 issues the generated secret code CdS to the laser processing machine 12. The laser processing machine 12 engraves the secret code CdS, for example, at a position adjacent to the public code CdP. Accordingly, the hash value reflecting the item information and the transaction records is recorded in the secret code CdS and is available for distribution together with the transaction item.

In the traceability system 120, one secret code CdS may be continuously used for multiple transaction parties TR, or a new secret code CdS may be issued for each transaction party TR. In the configuration in which the new secret code CdS is issued for each transaction party TR, the latest hash value reflecting the transaction records is generated based on occurrence of the transaction record of each transaction party TR. The history management server 20 newly generates the secret code CdS in which the latest hash value is recorded as the secret information, and provides data in the new secret code CdS to the laser processing machine 12 at the facility of the transaction party TR who performs the transaction. As a result, as an item transaction progresses, the contents (i.e., the hash value) in the secret code CdS is continuously updated to reflect the transaction records so far.

Since the secret information mainly includes the hash value, an amount of data in the secret information can be maintained at a constant level even when the item transaction progresses in the supply chain SC.

The history management server 20 is capable of further issuing a trace code QRt. The trace code QRt is a two-dimensional code such as a QR code attached to a final product FP supplied by the supply chain SC. The trace code QRt enables a consumer who obtains the final product FP to check the transaction records. The trace code QRt records, as an example, a hash value calculated from a last block on the blockchain and an IP address or URL indicating an inquiry destination of the transaction records.

The consumer of the final product FP can view the transaction records of the final product FP by using a user terminal UT such as a smartphone or a tablet terminal and using a traceability check application. Specifically, when the user terminal UT reads the trace code QRt attached to the final product FP, the user terminal UT transmits a reference request for the transaction records and the hash value to the history management server 20 that is the inquiry destination. When the history management server 20 receives the reference request, the history management server 20 extracts the item information and the transaction records associated with the hash value and generates retrieval data. The history management server 20 transmits the retrieval data to the user terminal UT that issues the reference request. The consumer of the final product FP can check the history of the transaction records by loading the retrieval data received from the history management server 20 using the traceability check application.

(Secret Code Forming Process) Next, the details of the code formation method of the present disclosure for forming the secret code CdS on the marking part BM will be described with reference to FIGS. 1 and 2 based on the code forming process shown in FIG. 3. In the code forming process, a part preparing step S10, a cleaning step S20, a coating agent preparing step S30, a masking step S40, an emissive layer forming step S50, and a laser marking step S60 are performed in this order.

In the part preparing step S10, a marking part BM on which the secret code CdS is to be marked is prepared. In the cleaning step S20, at least the flat portion FA, which includes the forming area CA of the secret code CdS, of the outer surface of the marking part BM prepared in the part preparing step S10 is cleaned. In the cleaning step S20, for example, a non-water-soluble solvent is used to remove dirt such as oil, grease, and dust adhering to the flat portion FA.

In the coating material preparing step S30, the coating material to be applied to the flat portion FA of the marking part BM is prepared. The coating material is a reactive paint that emits light in response to invisible light. The coating material contains an ultraviolet-reactive paint that emits light in response to ultraviolet light. As an example, the coating material is a colorless, transparent liquid product produced by mixing ultraviolet-reactive paint, acrylic clear paint, and a solvent such as thinner in a predetermined ratio (e.g., 1:60:60). An example of the ultraviolet-reactive paint used in this embodiment is Super Glo Fluorescent Leak Inspection Agent (DF-300 Liquid) manufactured by MARKTEC. The ultraviolet-reactive paint contains 45 to 55 wt % of water-soluble fluorescent paint and 45 to 55 wt % of water.

In the masking step S40, the periphery of the forming area CA of the secret code CdS is masked. The outer edge of the forming area CA corresponds to the outer edge of the quiet zone of the secret code CdS. As an example, the area to be surrounded by masking includes a margin of at least several millimeters from all sides of the forming area CA.

In the emissive layer forming step S50, the coating material is applied to the flat portion FA after the masking step S40. As a result, a colorless and transparent emissive layer 50 (see FIG. 1) is formed in an area including the forming area CA. To apply the coating material, a coating device 25 such as a spray gun is used. The coating device 25 sprays the liquid coating material prepared in the coating material preparing step S30 onto the flat portion FA by jetting high-pressure air or gas. After spraying, a predetermined drying time (for example, about 10 minutes) is ensured for the coating material to dry. In the emissive layer forming step S50, the process of applying the coating material using the coating device 25 and the process of drying the applied coating material are repeated multiple times (for example, about three times). In this manner, the emissive layer 50 is formed as a coating film containing the ultraviolet-reactive paint.

In addition, in the emissive layer forming step S50, the process of applying the coating material containing the ultraviolet-reactive paint may be performed by a printing method, a stamping method, or the like. In addition, the masking around the emissive layer 50 may be removed after the coating material is dried in the emissive layer forming step S50, or may be removed after the laser marking step S60. Furthermore, when the coating process and the drying process are repeated, the emissive layer 50 is formed in a layered form like a stack of very thin coating films. Thus, if multiple coating layers are formed, it can be considered that the coating process and the drying process have been performed repeatedly.

In the laser marking step S60, data for the secret code CdS provided from the history management server 20 is prepared by the laser processing machine 12. In the laser marking step S60, the laser processing machine 12 irradiates the emissive layer 50 with laser light to engrave the secret code CdS. The laser processing machine 12 irradiates the emissive layer 50 with laser light, for example, in the ultraviolet wavelength band (i.e., a wavelength of 343 nm).

In the laser marking step S60, a laser beam is irradiated onto the portions of the emissive layer 50 corresponding to the dark cells Ceb of the secret code CdS. On the other hand, the laser light is not irradiated onto the portions of the emissive layer 50 that corresponds to the light cells Cew. As a result, the dark cells have the emissive performance weaker than the light cells Cew. As a result, the portions of the emissive layer 50 that corresponds to the light cells Cew become the strong emissive portion 61, which emits strong light in response to ultraviolet light. On the other hand, the portions of the emissive layer 50 that correspond to the dark cells Ceb become the weak emissive portion 62, which emits light that is weaker than the strong emissive portion 61.

(Explanation of the mechanism for reducing the emissive performance) Next, the principle by which the ultraviolet-reactive paint emits light and the mechanism by which this emissive performance is reduced will be described with reference to FIG. 4.

The ultraviolet-reactive paint contains water-soluble fluorescent paint. This fluorescent paint emits a pale blue fluorescent light when exposed to ultraviolet light. The fluorescent paint excites electrons by absorbing the energy of ultraviolet light. The excited electrons are unstable and therefore return to the stable ground state. As the electrons return to the ground state, they radiate the excess energy as electromagnetic waves. The wavelength of the emitted electromagnetic waves is longer than the wavelength of the irradiated ultraviolet light. As a result, when irradiated with ultraviolet light, the fluorescent paint enters a light-emitting state in which it emits visible light having a longer wavelength than the ultraviolet light.

The emissive performance of such fluorescent paint is reduced by irradiation with laser light. The details will be described with reference to the results of the transmittance test shown in FIG. 4. For the transmittance test shown in FIG. 4, three measurement pieces are prepared. The first measurement piece is a measurement piece consisting only of a colorless and transparent quartz plate 140 (hereinafter, referred to as a reference measurement piece MSR). The second measurement piece is a measurement piece (hereinafter, a first measurement piece MS1) that is the quartz plate 140 with a transparent coating film 141 that does not contain ultraviolet-reactive paint. The transparent coating film 141 is formed by applying an acrylic clear coating on one side of the quartz plate 140. The third measurement piece is a measurement piece (hereinafter, a second measurement piece MS2) of the quartz plate 140 with a fluorescent coating film 142 containing an ultraviolet-reactive paint. The fluorescent coating film 142 is formed by coating the quartz plate 140 with the coating material. The coating material applied to the second measurement piece MS2 has the same components as the coating material prepared in the coating material preparing step S30 (see FIG. 3).

Figure 3:
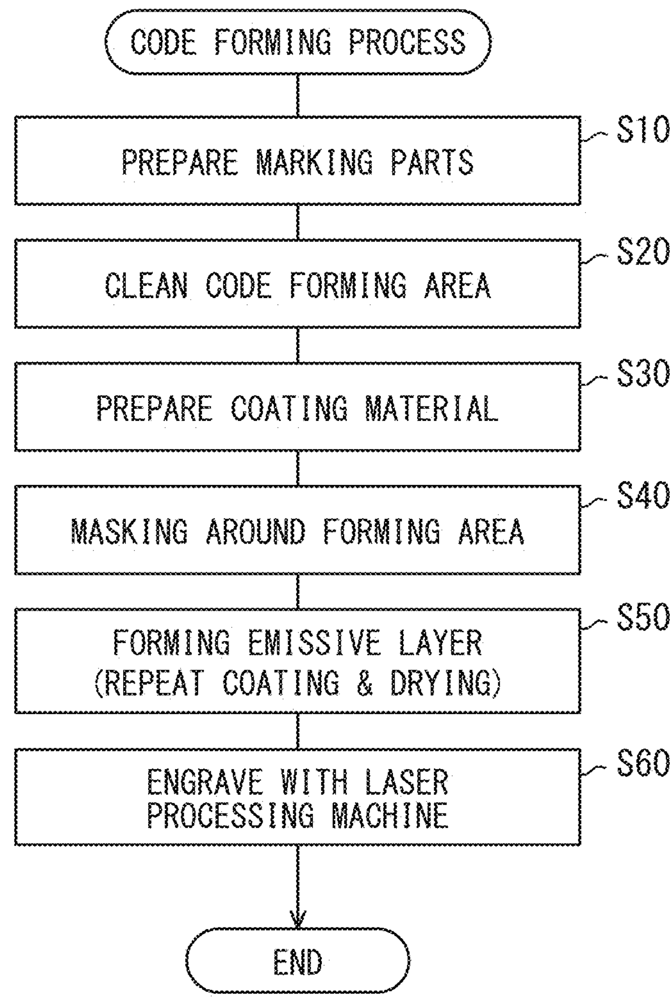
FIG. 3 is a flowchart showing details of a code forming process for forming a secret code.

The reference measurement piece MSR, the first measurement piece MS1, and the second measurement piece MS2 are processed by irradiating them with laser light in the ultraviolet wavelength band (e.g., a wavelength of 343 nm), similar to the laser marking step S60 (see FIG. 3). In the reference measuring piece MSR, the transmittance before the laser-light irradiation processing (the pre-processing transmittance) is the same as the transmittance after the laser-light irradiation processing (the post-processing transmittance). Similarly, for the first measurement piece MS1, the pre-processing transmittance is the same as the post-processing transmittance.

On the other hand, in the second measurement piece MS2, although the post-processing transmittance (55%) is lower than the post-processing transmittance of the first measurement piece MS1 (92%), the post-processing transmittance is significantly increased compared to the pre-processing transmittance (38%). Such an increase in the transmittance reduces the amount of ultraviolet light energy absorbed by the fluorescent paint in the processed fluorescent coating film 142. As a result, the number of excited electrons and therefore the amount of energy released as electromagnetic waves are reduced, which is thought to result in a decrease in the emissive performance that radiates visible light.

For the above reasons, in the laser marking step S60 (see FIG. 3) of the code formation process, the transmittance of ultraviolet light in the areas corresponding to the dark cells Ceb is made higher than the transmittance in the areas corresponding to the light cells Cew. As a result, it is possible to form, in the area corresponding to the dark cells Ceb, the weak emissive portion 62 which has a weaker emissive performance than the area corresponding to the bright cells Cew.

(Laser light output settings) The output of the laser light used in the above-mentioned laser marking process S60 (see FIG. 3) is set to a value that prevents discoloration of the surface of the emissive layer 50 and reduces the emissive performance of the ultraviolet-reactive paint. In the code formation method according to the present disclosure, whether the output of the laser light is appropriately set is quantitatively determined based on the surface state and light emitting state of the emissive layer 50 after the laser marking step S60. Hereinafter, the details of the indexes for determining whether the surface state and the light emitting state of the emissive layer 50 are good will be described based on FIGS. 5 to 9 with reference to FIGS. 1 and 2.

Figure 5:
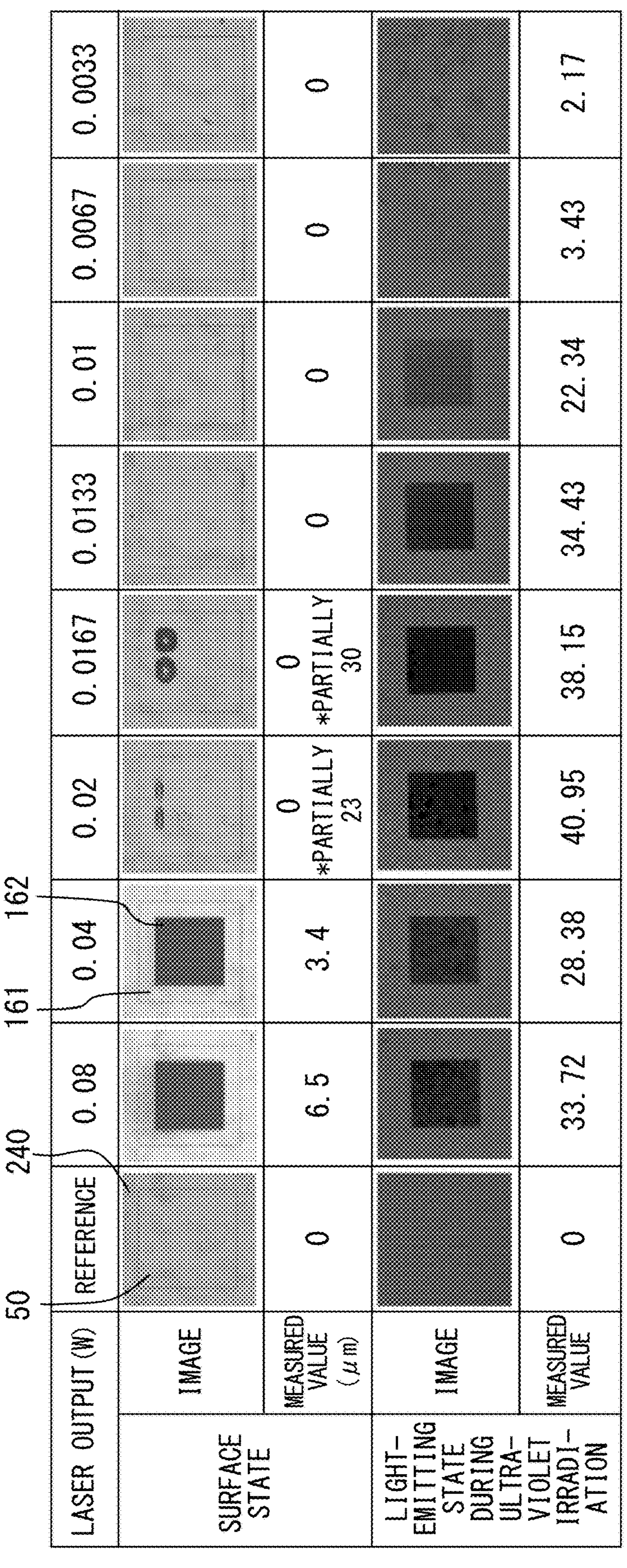
FIG. 5 is a diagram showing the difference in the surface state and light-emitting state of an emissive layer under different laser beam outputs.

FIG. 5 shows the difference in the surface state and the light emission state of the emissive layer 50 in a test in which the laser output was changed in eight steps within the range of 0.08 W to 0.0033 W. In the test shown in FIG. 5, a measurement sample MS3 is used in which the emissive layer 50 is formed on a steel plate material 240 (for example, SPCC) with a matte black coating, as shown in FIG. 6. The measurement sample MS3 includes multiple test irradiation regions (for example, 1 mm×1 mm). The test irradiation regions are irradiated with laser light having the conditions shown in FIG. 6. The output of the laser light is switched between the above-mentioned range. FIG. 5 shows the state of each test irradiation area observed under the conditions shown in FIG. 7 using a microscope (VHX-7100) manufactured by KEYENCE.

(1. Indicators for determining the surface state of the emissive layer) As shown in FIG. 5, if the output of the laser light in the laser marking step S60 is increased too much, the emissive layer 50 will discolor (see laser output 0.08 W, 0.04 W). In this case, the secret code CdS is easily visible even when not irradiated with ultraviolet light. Such discoloration of the emissive layer 50 is caused by the outer surface of the emissive layer 50 being scraped off by the laser light. Thus, in the laser marking step S60, the output of the laser light is set to a value that ensures the difference between the depth of the non-irradiated area 161, which is not irradiated with the laser light, and the depth of the irradiated area 162, which is irradiated with the laser light, (hereinafter referred to as the depth difference value) falls within a predetermined range. Specifically, the output of the laser light may be set to a value that ensures the depth difference value falls within the range of 0 to 1.0 μm, or within the range of 0 to 0.2 μm. For example, in the sample group shown in FIG. 5, a laser output range of 0.0133 W or less is a preferred setting range.

Here, the non-irradiated area 161 is an area that corresponds to the strong emissive portion 61 and the light cells Cew. On the other hand, the irradiated area 162 is an area that corresponds to the weak emissive portion 62 and the dark cells Ceb. Thus, in the secret code CdS (see FIG. 1), if the outer surface of the emissive layer 50 is defined as the reference surface, the depth difference value is the difference in depth from the reference surface between the strong emissive portion 61 and the weak emissive portion 62. As described above, the depth difference value may fall in the range of 0 to 1.0 μm, or in the range of 0 to 0.2 μm.

The depths of the non-irradiated area 161 (i.e., the strong emissive portion 61) and the irradiated area 162 (i.e., the weak emissive portion 62) are measured under the conditions shown in FIG. 8 using, for example, a white light interferometer (nexview) made by ZYGO Corporation. The depth measurement is performed, for example, near the center of one cell Ce (see FIG. 1). As an example, the average value of the depth values measured in multiple light cells Cew is taken as the depth value of the non-irradiated area 161 (i.e., the strong emissive portion 61), and the average value of the depth values measured in multiple dark cells Ceb is taken as the depth value of the irradiated area 162 (i.e., the weak emissive portion 62).

In addition, the maximum, minimum or median of the depth values measured in the multiple light cells Cew may be taken as the depth value of the non-irradiated area 161, and the maximum, minimum or median of the depth values measured in the multiple dark cells Ceb may be taken as the depth value of the irradiated area 162. Furthermore, the depth values measured in a specific light cell Cew and a specific dark cell Ceb may be depth values representative of the non-irradiated area 161 and the irradiated area 162, respectively.

In the test shown in FIG. 5, when the laser output was 0.02 W or 0.0167 W, the depth of the irradiated area 162 changed significantly in some areas. This is a phenomenon caused by the processing threshold of the black painted portion of the steel plate material 240 lower than the processing threshold of the ultraviolet-reactive paint.

More specifically, laser light output of 0.04 W or more exceeds the processing threshold of the ultraviolet-reactive paint. Thus, when the laser output is 0.08 W or 0.04 W, processing of the ultraviolet-reactive paint reduces the output of the laser light, so that no processing occurs in the black painted portion of the steel plate material 240. On the other hand, a laser beam output of 0.0133 or less falls below the processing thresholds of both the ultraviolet-reactive paint and the black painted portion. Thus, when the laser output is 0.0133, 0.01, 0.0067 or 0.0033 W, the laser light passes through the emissive layer 50 and reaches the black painted portion, but does not process the black painted portion.

In contrast, laser light output of 0.02 W or 0.0167 W does not exceed the processing threshold of the ultraviolet-reactive paint, but exceeds the processing threshold of the black painted portion. Thus, when the laser output is 0.02 W or 0.0167 W, the laser light passes through the emissive layer 50 and reaches the black-painted portion, causing processing of some of the black-painted portion. This causes the black-painted portion reached by the laser light to evaporate or get impact. As a result, the emissive layer 50 that covers the black painted portion is pressed, causing the emissive layer 50 to locally bulge. In view of the above, the output of the laser light may be appropriately adjusted according to the physical properties of the flat portion FA (see FIG. 1). The output of the laser light may be set to a value that satisfies the above-mentioned processing depth conditions and does not exceed the processing threshold of the flat portion FA.

(2. Indicators for determining the emissive state when irradiated with ultraviolet light) As shown in FIG. 5, if the output of the laser light in the laser marking step S60 is insufficient, the reduction in the emissive performance will be insufficient (see laser output 0.0067 W, 0.0033 W). In this case, even if ultraviolet light is irradiated, it is difficult to read the CdS secret code. To avoid such a situation, in the laser marking step S60, the output of the laser light is set to a value that make a specified value fall within a predetermined range. The specified value is calculated by subtracting the color strength of the irradiated area 162 from the color strength of the non-irradiated area 161 (hereinafter referred to as a color strength difference value).

Here, the definition of the above color strength will be explained. The color strength is a value that indicates the color in a grayscale image obtained by converting a captured image of the emissive layer 50 (hereinafter, referred to as a strength measurement image). The value of the color strength corresponding to black is 1 and the value of the color strength corresponding to white is 100. The color strength corresponds to a value indicating the luminance of light emitted when irradiated with ultraviolet light, and the value is larger for areas that emit light with higher luminance and smaller for areas that emit light with lower luminance. The color strength is measured under the conditions shown in FIG. 9 using a black light manufactured by Ohm Electric INC., a camera manufactured by Panasonic Corporation, and image processing software manufactured by Adobe Inc., and the like.

In measuring color strength, a full-color strength measurement image is first generated by capturing the emissive layer 50 (i.e., the secret code CdS) with a camera while irradiating it with ultraviolet light using a black light. This strength measurement image is converted into a grayscale image using the image processing software. In the grayscale image, each pixel retains only brightness information. The value (i.e., tone value) indicating the brightness of each pixel, expressed as a percentage, is the color strength.

In the laser marking step S60, the output of the laser light is set to a value that makes the color strength difference value equal to or greater than 30, or equal to or greater than 35. For example, in the sample group shown in FIG. 5, a laser output range of 0.0133 W or more is the preferred setting range. Similarly, in the case of the secret code CdS (see FIG. 1), the color strength difference value is obtained by subtracting the color strength of the weak emissive portion 62 from the color strength of the strong emissive portion 61. As described above, the color strength difference value is 30 or more, or 35 or more.

In the above color strength measurements, the color strength of one cell is the average gradation value of the pixel group around the center of the one cell. More specifically, the color strength is the average gradation value of the pixel group photographed a central 0.8 mm square area of the one cell Ce that is 1 mm square. The color strength of the multiple light cells Cew is then averaged to get the color strength value of the non-irradiated area 161 (i.e., the strong emissive portion 61), and the color strength of the multiple dark cells Ceb is averaged to get the color strength value of the irradiated area 162 (i.e., the weak emissive portion 62).

In addition, the maximum, minimum or median of the color strength of the multiple light cells Cew may be taken as a value indicating the color strength of the non-irradiated area 161, and the maximum, minimum or median of the color strength of the multiple dark cells Ceb may be taken as a value indicating the color strength of the irradiated area 162. Furthermore, the color strength values of a specific light cell Cew and a specific dark cell Ceb may be regarded as color strength representative of the non-irradiated area 161 and the irradiated area 162, respectively.

(Summary of Embodiment) In the present embodiment described so far, the portions of the emissive layer 50, which contains the ultraviolet-reactive paint, that correspond to the dark cells Ceb have reduced emissive performance compared to the portions that correspond to the light cells Cew. Thus, irradiation with invisible ultraviolet light reveals an array of the dark cells Ceb and the light cells Cew with different luminous strength. According to the above, a special reading device (the code reader 23) is not required to read the secret code CdS, so that the convenience of the secret code CdS can be ensured.

Additionally, in this embodiment, the emissive layer 50 is formed over the entire area including the forming area CA, and individual dark cells Ceb are formed in this integral emissive layer 50. Thus, the durability of the coating film can be more easily ensured compared to a case where fine coating films are separately formed at the locations corresponding to the dark cells Ceb. According to the above, it is possible to mark a hard-to-erasable secret code CdS on the marking part BM which is used in a variety of environments. As a result, the convenience of the secret code CdS can be further improved.

Furthermore, in this embodiment in which the dark cells Ceb are engraved by a laser, the secret code CdS has higher resolution while durability is ensured, as compared to a form in which the dark cells Ceb are printed. Thus, the forming area CA in which the secret code CdS is formed can be made smaller while ensuring the amount of recordable information. This makes it possible to engrave the secret code CdS on the narrow flat portion FA, thereby further improving the convenience of the secret code CdS.

Furthermore, in this embodiment, in the laser marking step S60 of irradiating with laser light, the invisible light transmittance of the portions corresponding to the dark cells Ceb is made higher than the invisible light transmittance of the portions corresponding to the light cells Cew. According to the above, the energy absorbed by the fluorescent paint is reduced, so that the emissive function of the portions corresponding to the dark cells Ceb can be reliably reduced. As a result, the difference in luminance between the light cells Cew and the dark cells Ceb when irradiated with ultraviolet light becomes large, making it easier to read the secret code CdS.

Additionally, in the laser marking step S60 of this embodiment, the output of the laser light is set to a value that does not discolor the emissive layer 50. According to the above, it is possible to prevent the secret code CdS from being recognized when not irradiated with laser light. As a result, it becomes possible to provide a highly confidential secret code CdS.

Specifically, in this embodiment, the output of the laser light is set to a value that ensures the difference between the depth of the non-irradiated area 161, which is not irradiated with the laser light, and the depth of the irradiated area 162, which is irradiated with the laser light, falls within the range of 0 to 1.0 μm, or, within the range of 0 to 0.2 μm. In other words, in the secret code CdS, the difference in depth from the reference surface between the strong emissive portion 61 and the weak emissive portion 62 falls within the range of 0 to 1.0 μm, or within the range of 0 to 0.2 μm. By setting the range of the depth difference value in this way, the confidentiality of the secret code CdS can be ensured more reliably.

In the laser marking step S60 of this embodiment, the output of the laser light is set to a value that reduces the emissive performance of the ultraviolet-reactive paint. According to the above, the emissive performance of the portions corresponding to the dark cells Ceb is reliably reduced, so that it is possible to ensure a luminance difference between the light cells Cew and the dark cells Ceb when irradiated with ultraviolet light. Therefore, reading the secret code CdS under ultraviolet light irradiation becomes much easier.

Specifically, in this embodiment, the captured image of the emissive layer 50 is converted to a grayscale image. The color value in the grayscale image is defined as the color strength, where the color strength of black is 1 and the color strength of white is 100. Furthermore, in the laser marking step S60, the output of the laser light is set to a value that makes the specified value which is calculated by subtracting the color strength of the irradiated area 162, where the laser light is irradiated, from the color strength of the non-irradiated area 161, where the laser light is not irradiated, equal to or greater than 30, or equal to or greater than 35. In other words, in the secret code CdS, the specified value calculated by subtracting the color strength of the weak emissive portion 62 from the color strength of the strong emissive portion 61 is equal to or greater than 30, or equal to or greater than 35. By setting the range of the color strength difference values in this way, the readability of the secret code CdS when irradiated with ultraviolet light can be further ensured.

Furthermore, in the emissive layer forming step S50 of this embodiment, the process of applying the coating material and the process of drying the applied coating material are repeated multiple times. Thus, the thickness of the coating film formed as the emissive layer 50 can be ensured sufficiently. As a result, it becomes possible for the light cells Cew to emit light with higher luminance when irradiated with ultraviolet light. This increases the difference in luminance between the light cells Cew and the dark cells Ceb when irradiated with ultraviolet light, making it easier to read the secret code CdS.

In the above embodiment, the secret code CdS corresponds to the "information code", the light cells Cew corresponds to the "light area", the dark cells Ceb corresponds to the "dark area", and the marking part BM corresponds to the "target object".

(Other embodiments) Although one embodiment of the present disclosure has been described above, the present disclosure is not construed as being limited to the above-mentioned embodiment, and can be applied to various embodiments and combinations within a scope that does not depart from the gist of the present disclosure.

In the first modification of the above embodiment, the secret code CdS is engraved on the marking part BM in place of the public code CdP. That is, two secret codes CdS are formed side by side on the single marking part BM. One of the secret codes CdS is an information code used in the distribution management system 110. According to the above-described first modification, it is possible to record public information without impairing the design of the marking part BM.

In the second modification of the above embodiment, the secret code CdS is formed so as to overlap the public code CdP. That is, after the public code CdP is laser engraved on the marking part BM, the transparent emissive layer 50 is formed to cover the public code CdP. Then, the secret code CdP is laser engraved on the emissive layer 50 covering the public code CdP. In the above-described second modification, the formation position of the invisible secret code CdS can be grasped based on the position of the visible public code CdP.

In a third modification of the above embodiment, instead of the above-mentioned hash value, a unique identification (UID) for identifying an item shipped from the transaction party TR is recorded in the secret code CdS as secret information. As in the third modification, the secret information recorded in the secret code CdS may be changed as appropriate.

Furthermore, the use of the secret code CdS is not limited to the management of the supply chain SC in the traceability system 120, but may be used by a system other than the traceability system 120. In this case, the secret code CdS may be used alone without being combined with the public code CdP. As described above, the secret code CdS according to the present disclosure is an information code that is particularly suitable for various applications that require recording information without making the marking stand out.

In the secret code CdS according to the fourth modification of the above embodiment, infrared light is used as the invisible light instead of ultraviolet light. That is, the coating material used for the emissive layer contains a fluorescent coating material that emits visible light when irradiated with infrared light. Then, in the laser marking step S60 (see FIG.

3), the emissive function of the emissive layer is reduced by marking the emissive layer with a laser beam. Furthermore, to read the secret code CdS, an infrared light source is used instead of the ultraviolet light source 24 (see FIG. 2).

In the fifth modification of the above embodiment, the repetition of the process of applying the coating material and the process of drying the applied coating material is omitted. As in the fifth modification, so long as the luminance of the emissive layer 50 when irradiated with invisible light can be sufficiently ensured, the details of the emissive layer forming step S50 may be appropriately changed. Furthermore, the mixing ratio of the coating material may be changed as appropriate.

In the sixth modification of the above embodiment, the public code CdP and the secret code CdS are different versions from each other. In the seventh modification of the above embodiment, the public code CdP and the secret code CdS have different sizes. That is, the secret code CdS may be a QR code larger in size than the public code CdP, or may be a QR code smaller in size than the public code CdP. Furthermore, in the eighth modification of the above embodiment, the public code CdP and the secret code CdS are different in version (i.e., in the number of cells). That is, the version of the secret code CdS may be greater than the version of the public code CdP, or may be less than the version of the public code CdP. As in these modifications 6 to 8, the specifications of the public code CdP and the secret code CdS may be modified as appropriate.

Furthermore, the two-dimensional code used as the public code CdP and the secret code CdS is not limited to a QR code. A two-dimensional code different from the QR code may be used for the public code CdP and the secret code CdS. Furthermore, the public code CdP and the secret code CdS may be two-dimensional code or one-dimensional code based on different standards.

In the above embodiment, the black cells of the original data of the two-dimensional code are linked to the dark cells Ceb of the secret code CdS for laser marking, and the white cells of the original data are linked to the light cells Cew for laser marking. In contrast, in the ninth modification of the above embodiment, the association between the black and white cells of the original data and the dark and light cells Ceb and Cew to be marked is switched. That is, the black cells in the original data are marked as light cells Cew, and the white cells in the original data are marked as dark cells Ceb.

In the embodiment, in addition to the secret code CdS used in the supply chain SC, the trace code QRt is issued and attached to the final product FP. However, the public code CdP may be used as the trace code QRt by being registered in the history management server 20. The final product FP supplied through the supply chain SC may be appropriately changed. For example, the traceability system 120 may manage various articles such as an automobile, a battery, a semiconductor, fresh food, an aquatic product, food, flowers, a pharmaceutical, or a chemical.

The hash function used in the history management server 20 is a cryptographic hash function. The hash function does not output the same hash value from different inputs and it is substantially impossible to estimate the input from the output hash value. For example, instead of SHA-256 described above, an encryption algorithm such as SHA-1, SHA-2, or SHA-3 may be appropriately used according to an output length (the number of bits) recordable in the secret code CdS as secret information. The code forming processing executed by the history management server 20 may be executed by a control circuit of the laser processing machine 12 on an edge side.

In the embodiment, functions provided by the history management server, the code readers, and the like may be provided by software and hardware for executing the software, only software, only hardware, or a composite combination thereof. In cases where these functions are provided by electronic circuits as hardware, the respective functions can be also provided by analog circuits or digital circuits which include a large number of logic circuits.

The processing unit (signal processing unit) in the embodiment may include at least one computational core such as a central processing unit (CPU) and a graphics processing unit (GPU). The processing unit may further include a field-programmable gate array (FPGA), a neural network processing unit (NPU), and an IP core having another dedicated function.

The form of the storage medium (non-transitory tangible storage medium) which is employed as each storage unit in the above embodiments and stores each program may be changed as appropriate. The storage medium is not limited to the configuration provided on the circuit board. For example, the storage medium may be a memory card or the like, and inserted into a slot portion, and electrically connected to the computer bus. The storage medium may be an optical disc, a hard disk drive, or a solid state drive used as a source of copying or distributing a program to a computer.

The control unit and the method thereof described in the present disclosure may be implemented by a special purpose computer, which includes a processor programmed to execute one or more functions performed by computer programs. Alternatively, the device and the method described in the present disclosure may be implemented by a special purpose hardware logic circuit. Alternatively, the device and the method described in the present disclosure may be implemented by one or more special purpose computers configured by a combination of a processor executing a computer program and one or more hardware logic circuits. The computer program may also be stored on a non-transitory computer-readable storage medium as an instruction executed by a computer.

The invention claimed is:

1. A code formation method for forming an information code on a target object, the information code storing information with an array of a light area and a dark area, the code formation method comprising:

forming an emissive layer by applying, to the target object, a coating material containing a reactive paint that emits light in response to invisible light, the emissive layer including a forming area of the information code; and irradiating a portion of the emissive layer corresponding to the dark area with laser light to reduce an emissive performance of the dark area to be lower than an emissive performance of the light area, wherein the irradiating with the laser light includes irradiating with the laser light to make a transmittance for the invisible light in the portion of the emissive layer corresponding to the dark area higher than a transmittance for the invisible light in a portion of the emissive layer corresponding to the light area.

2. The code formation method according to claim 1, wherein the irradiating with the laser light includes setting an output of the laser light to a value that does not discolor the emissive layer.

3. The code formation method according to claim 1, wherein the emissive layer includes a non-irradiated area which is not irradiated with the laser light and an irradiated area which is irradiated with the laser light, and the irradiating with the laser light includes setting an output of the laser light to a value that ensures a difference between a depth of the non-irradiated area and a depth of the irradiated area falls within a range 0 to 1.0 μm.

4. The code formation method according to claim 1, wherein the emissive layer includes a non-irradiated area which is not irradiated with the laser light and an irradiated area which is irradiated with the laser light, and the irradiating with the laser light includes setting an output of the laser light to a value that ensures a difference between a depth of the non-irradiated area and a depth of the irradiated area falls within a range 0 to 0.2 μm.

5. The code formation method according to claim 1, wherein the irradiating with the laser light includes setting an output of the laser light to a value that reduces the emissive performance of the reactive paint.

6. The code formation method according to claim 1, wherein a color strength is defined as a color value in a grayscale image of a captured image that captures the emissive layer, where the color strength of black is 1 and the color strength of white is 100, the emissive layer includes a non-irradiated area which is not irradiated with the laser light and an irradiated area which is irradiated with the laser light, a specified value is calculated by subtracting the color strength of the irradiated area from the color strength of the non-irradiated area, and the irradiating with the laser light includes setting an output of the laser light to a value that makes the specified value equal to or greater than 30.

7. The code formation method according to claim 1, wherein a color strength is defined as a color value in a grayscale image of a captured image that captures the emissive layer, where the color strength of black is 1 and the color strength of white is 100, the emissive layer includes a non-irradiated area which is not irradiated with the laser light and an irradiated area which is irradiated with the laser light, a specified value is calculated by subtracting the color strength of the irradiated area from the color strength of the non-irradiated area, and the irradiating with the laser light includes setting an output of the laser light to a value that makes the specified value equal to or greater than 35.

8. The code formation method according to claim 1, wherein the forming of the emissive layer includes the applying of the coating material and drying of the applied coating material, and the applying of the coating material and the drying of the applied coating material are repeated multiple times.

9. An information code that stores information with an array of a light area and a dark area, the information code comprising:

an emissive layer containing a reactive paint that emits light in response to an invisible light;

a strong emissive portion corresponding to the light area of the emissive layer and configured to emit light in response to the invisible light; and a weak emissive portion corresponding to the dark area of the emissive layer, wherein an emissive performance of the reactive paint in the weak emissive portion is lower than an emissive performance in the strong emissive portion, wherein the weak emissive portion includes the reactive paint.

10. The information code according to claim 9, wherein an outer surface of the emissive layer is a reference surface, and a difference in a depth from the reference surface between the strong emissive portion and the weak emissive portion falls within a range of 0 to 0.2 μm.

11. The information code according to claim 9, wherein a color strength is defined as a color value in a grayscale image of a captured image that captures the emissive layer, where the color strength of black is 1 and the color strength of white is 100, a specified value is calculated by subtracting the color strength of the weak emissive portion from the color strength of the strong emissive portion, and the specified value is equal to or greater than 35.

12. An information code that stores information with an array of a light area and a dark area, the information code comprising:

an emissive layer containing a reactive paint that emits light in response to an invisible light;

a strong emissive portion corresponding to the light area of the emissive layer and configured to emit light in response to the invisible light; and a weak emissive portion corresponding to the dark area of the emissive layer, wherein an emissive performance of the reactive paint in the weak emissive portion is lower than an emissive performance in the strong emissive portion, wherein an outer surface of the emissive layer is a reference surface, and a difference in a depth from the reference surface between the strong emissive portion and the weak emissive portion falls within a range of 0 to 1.0 μm.

13. An information code that stores information with an array of a light area and a dark area, the information code comprising:

an emissive layer containing a reactive paint that emits light in response to an invisible light;

a strong emissive portion corresponding to the light area of the emissive layer and configured to emit light in response to the invisible light; and a weak emissive portion corresponding to the dark area of the emissive layer, wherein an emissive performance of the reactive paint in the weak emissive portion is lower than an emissive performance in the strong emissive portion, wherein a color strength is defined as a color value in a grayscale image of a captured image that captures the emissive layer, where the color strength of black is 1 and the color strength of white is 100, a specified value is calculated by subtracting the color strength of the weak emissive portion from the color strength of the strong emissive portion, and the specified value is equal to or greater than 30.

* * * * *